United States Patent [19]
Hult et al.

[11] Patent Number: 5,487,213
[45] Date of Patent: Jan. 30, 1996

[54] METHOD OF ASSEMBLING AN ELECTRIC MOTOR

[75] Inventors: David R. Hult; Jeffery L. Young, both of St. Peters; Stuart V. Holsten, O'Fallon, all of Mo.

[73] Assignee: Emerson Electric Co., St. Louis, Mo.

[21] Appl. No.: 236,198

[22] Filed: May 2, 1994

[51] Int. Cl.$^6$ ................................................ H02K 15/14
[52] U.S. Cl. .......................... 29/596; 310/42; 310/89; 310/258
[58] Field of Search ............................. 29/596, 597, 598, 29/732; 310/42, 258, 259, 89

[56] References Cited

U.S. PATENT DOCUMENTS

| | | | |
|---|---|---|---|
| 2,236,956 | 4/1941 | Van Der Heem | 171/252 |
| 2,763,802 | 9/1956 | Dolan | 310/255 |
| 3,165,816 | 1/1965 | Thompson et al. | 29/155.5 |
| 3,268,986 | 8/1966 | Lacy | 29/155.5 |
| 3,755,889 | 9/1973 | Busian | 29/596 |
| 4,059,776 | 11/1977 | Schreiber et al. | 310/242 |
| 4,901,428 | 2/1990 | King | 29/596 |
| 4,953,284 | 9/1990 | Hammer et al. | 29/596 |
| 5,095,611 | 3/1992 | Smith | 29/596 |

*Primary Examiner*—Carl E. Hall
*Attorney, Agent, or Firm*—Polster, Lieder, Woodruff & Lucchesi

[57] ABSTRACT

A motor manufacturing and its method of assembly are disclosed. The motor includes lower and upper end frames with bearings, an armature assembly rotatably mounted in the bearings of the lower and upper end frames, and a winding field assembly supported between the lower and upper end frames and surrounding the armature assembly. The method includes the steps of inserting one end of the armature assembly into the bearing of the lower end frame, positioning the winding field assembly over the armature assembly while also stacking the winding field assembly on the lower end frame, stacking the upper end frame on the winding field assembly while also positioning an opposite end of the armature assembly into the bearing of the upper end frame, and securing the lower end frame, winding field assembly and upper end frame to each other. Motor brush and brush holder assemblies are also secured to the upper end frame in a novel releasable locking arrangement, in order to provide self compensating adjustment of the brushes relative to a commutator that surrounds the armature assembly.

6 Claims, 6 Drawing Sheets

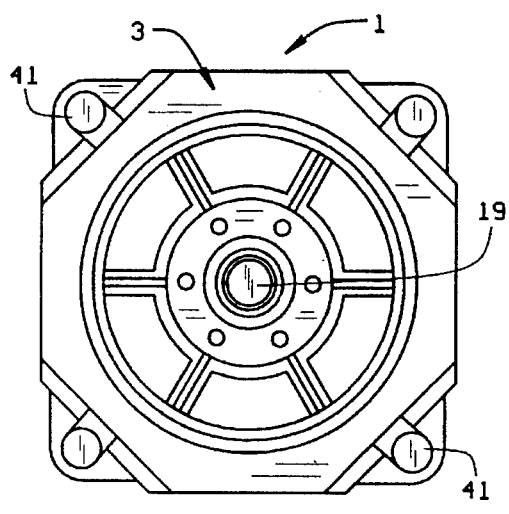
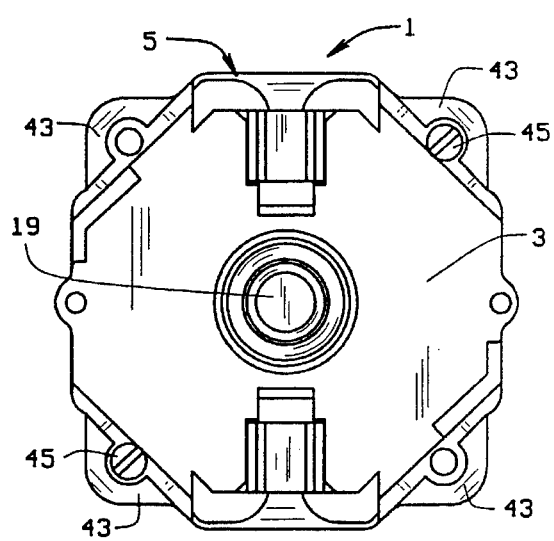
FIG. 4    FIG. 5
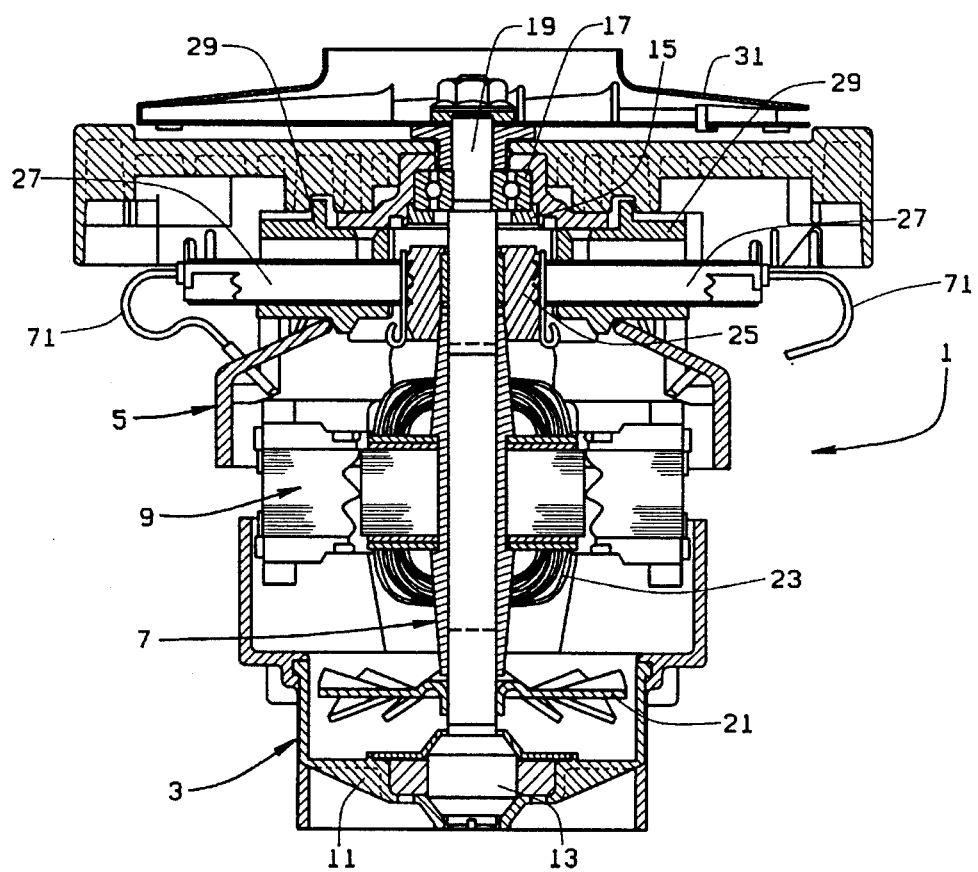
FIG. 6

5,487,213

METHOD OF ASSEMBLING AN ELECTRIC MOTOR

BACKGROUND OF THE INVENTION

The present invention relates to a motor design for manufacturing and its method of assembly and further includes an improved brush element/brush holder assembly for use in such motors The present invention relates primarily to manufacturing efficiencies and economies in the production of motors. At the same time, the motors produced must have consistently and accurately aligned bearings and motor shaft components Otherwise, motor efficiency, performance and longevity will be affected.

There are many well known prior art techniques for manufacturing motors which include, in a general overall construction, end frames with bearings, an armature assembly mounted in the bearings of the end frames and a winding field assembly surrounding the armature assembly. Examples of such prior art techniques include U.S. Pat. Nos. 2,236,956; 3,165,816; 3,268,986 and 5,095,611. Each of the aforementioned and other prior art patents disclose various techniques for assembling motors of the general type described above.

The present invention discloses new and improved techniques for assembling motor components by virtue of coordinated motor component design which thus greatly facilitates manufacturing operations and the assembled motor that results.

SUMMARY OF THE INVENTION

Among the several objects and advantages of the present invention include:

The provision of a new and improved motor designed for manufacturing and its method of assembly;

The provision of the aforementioned motor designed for manufacturing and its method of assembly which employs stacked and assembled components to facilitate motor assembly;

The provision of the aforementioned motor designed for manufacturing and its method of assembly in which the stacked component arrangement enables assembly of at least some of the components when located in various relative positions to one another;

The provision of the aforementioned motor designed for manufacturing and method of assembly which further employs an improved method for also fastening the stacked components relative to one another;

The provision of the aforementioned motor designed for manufacturing and its method of assembly which also employs an improved method and construction for the snap-in assembly of brush elements relative to a commutator;

The provision of the aforementioned motor designed for manufacturing and its method of assembly in which the brush elements include self-compensating adjustment means relative to a commutator positioned about the armature assembly; and The provision of the aforementioned motor designed for manufacturing and its method of assembly which overcomes problems associated with the prior art while utilizing efficient, economical, consistent and accurate motor assembly techniques.

Briefly stated, the motor designed for manufacturing and its method of assembly relates to an electric motor having lower and upper end frames with bearings, an armature assembly rotatably mounted in the bearings of the lower and upper end frames, and a winding field supported by the lower and upper end frames which surrounds the armature assembly. The method steps include: inserting one end of the armature assembly into the bearing of the lower end frames; positioning the winding field assembly over the armature assembly while also stacking the winding field assembly on the lower end frame; stacking the upper end frame on the winding field assembly while also positioning an opposite end of the armature assembly into the bearing of the upper end frame; and securing the lower end frame, winding field assembly and upper end frame to each other.

The winding field assembly is constructed to be universally adaptable relative to the upper and lower end frames and the method includes the further step of stacking the winding field assembly on the lower end frame in one of at least several relative positions to each other.

The lower and upper end frames and the winding field assembly may be polygonally shaped relative to one another such that the method includes the further step of orienting the polygonally shaped lower end frame, winding assembly and upper end frame during assembly to one another.

The lower end frame, winding field assembly and upper end frame are also provided with peripherally spaced fastening ears such that the method includes the further step of also aligning the peripherally spaced fastening ears during the assembly of the lower end frame, winding field assembly and upper end frame relative to one another.

The lower end frame, winding field assembly and upper end frame include four peripherally spaced and aligning fastening ears positioned approximately ninety degrees apart from one another such that the method includes the further step of inserting and securing two threaded elements relative to two of the four peripherally spaced and aligned fastening ears which are positioned 180° apart from one another.

The present invention further includes an electrical motor brush and brush holder assembly for use in an electric motor in which each brush has a generally elongated shape and the brush holder has a complementary shaped elongated slot for receiving the brush. An individual spring element holds and mounts the brush in its respective associated elongated slot in a biased condition relative to the brush holder. The spring element is constructed to apply a continuous biasing force as the brush moves in either direction within its respective associated elongated slot. The spring element includes self-compensating adjustment means for various positions of the brush within its respective associated elongated slot of the brush holder.

The self-compensating adjustment means includes at least one torsionally wound spring section enabling same to be progressively unwound during movement of the brush within its respective associated elongated slot in a particular direction.

A pair of generally cylindrically-shaped openings are formed in the brush holder on opposite sides of and connected to its respective associated elongated slot, and the spring element includes spaced complementary shaped torsionally wound spring ends connected by an intermediate web section in which the torsionally wound spring ends are received within the generally cylindrically-shaped openings with the intermediate web section extending across the respective associated elongated slot for engaging the brush along an end surface in order to bias the brush in the brush holder while allowing the torsionally wound spring ends to jointly progressively unwind to enlarge the intermediate web section as an associated brush is moved in its respective elongated slot.

The brush holder includes locking elements for releasable interlocking relative to a motor frame. The locking elements may include upper and lower complementary releasable locking elements on the brush holder and the motor frame. The resulting electric motor includes upper and lower end frames with bearings, an armature assembly rotatably mounted in the bearings of the lower and upper end frames, a winding field assembly supported between the upper and lower end frames and surrounding the armature assembly, the lower end frame, winding field assembly and upper end frame being secured to one another, and brush elements being secured to the upper end frame with an inner end of the brush elements being located in proximity to a commutator mounted on the armature assembly.

The lower end frame, winding field assembly and upper end frame are secured to one another by fastening elements that pass through peripherally spaced and aligned fastening ears formed in the lower end frame, winding field assembly and upper end frame. The brush elements are mounted in brush holders that include locking elements for releasable interlocking of the brush elements to the upper end frame.

The brush holders include self-compensating adjustment means for the brush elements relative to the commutator. Such self-compensating adjustment means include a spring element with torsionally wound spring ends that unwind during the self-compensating adjustment of the brush elements.

These and other objects and advantages of the present invention will become apparent from the description that follows.

BRIEF DESCRIPTION OF THE DRAWINGS

In the drawings.

FIG. 4 is a bottom plan view of the motor shown in FIG. 1;

FIG. 5 is a top plan view of the motor shown in FIG. 1;

FIG. 6 is a sectional view of the motor shown in FIG. 1 and illustrating the upper and lower frames, armature assembly and field winding which constitute the main components of the motor designed for manufacturing illustrated in FIG. 1;

Corresponding numerals will be used throughout the several FIGURES of the drawings.

DESCRIPTION OF THE PREFERRED EMBODIMENTS

Figure 1:
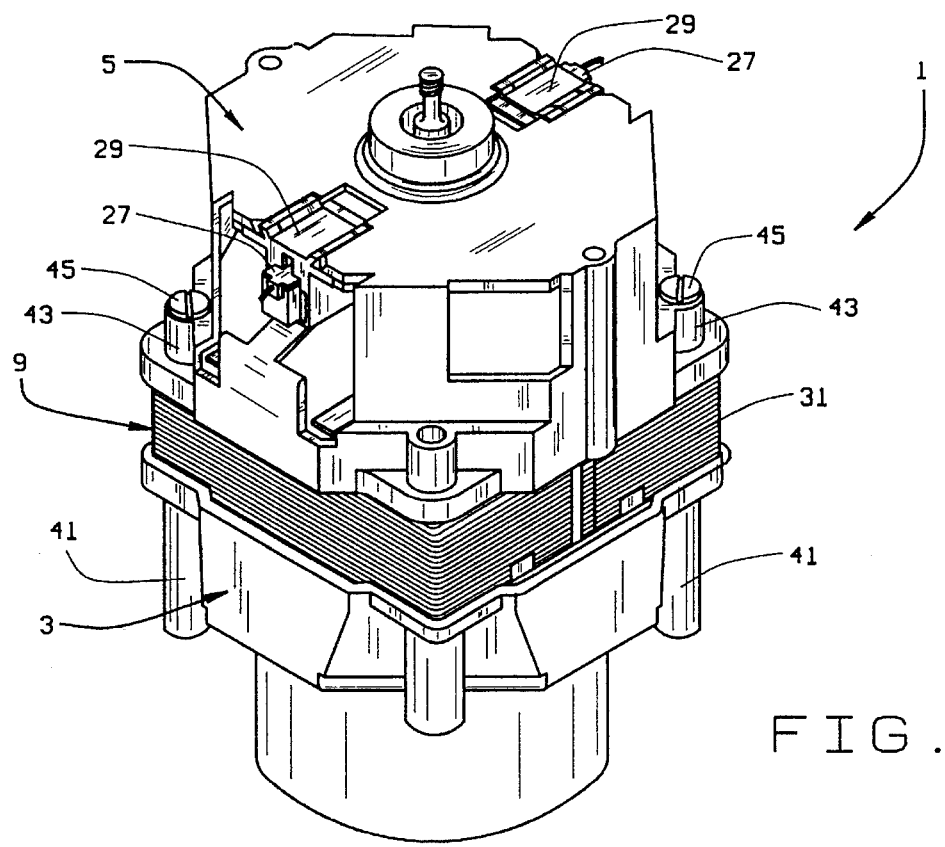
FIG. 1 is a perspective view of the motor designed for manufacturing that is used with the method of assembly of the present invention.
Figure 2:
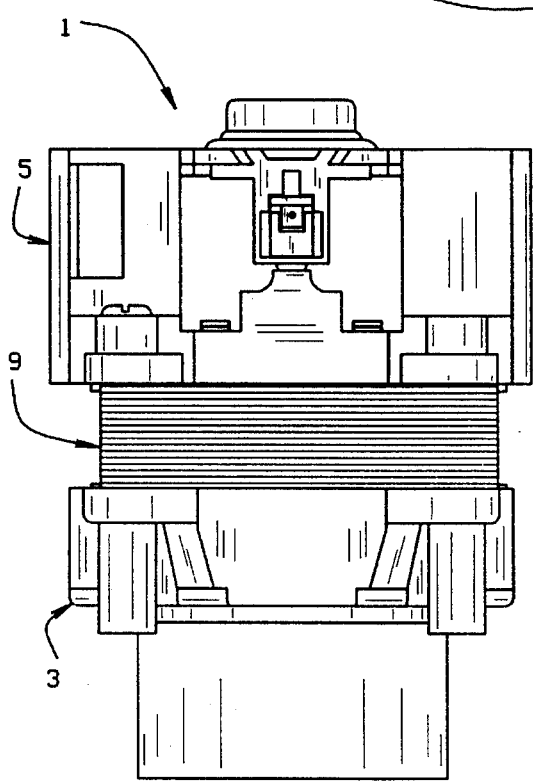
FIG. 2 is a side elevational view of the motor shown in FIG. 1 as viewed along one side thereof.
Figure 3:
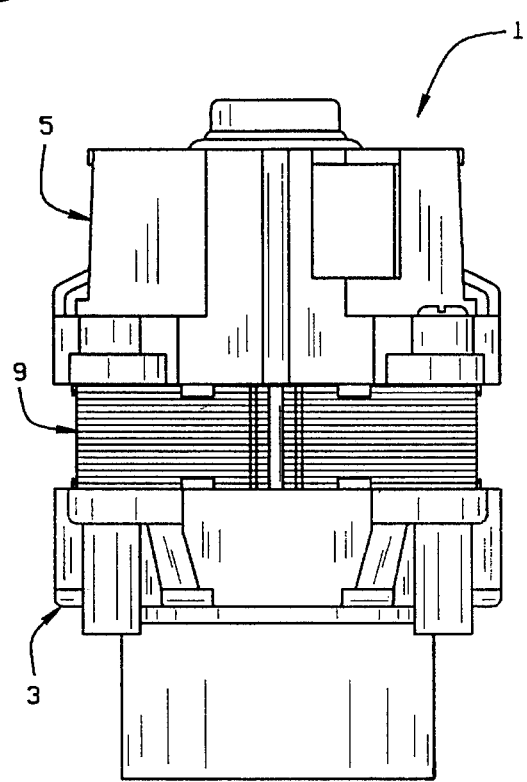
FIG. 3 is side elevational view of the motor shown in FIG. 1 as viewed along an adjacent side section thereof.

The following detailed description illustrates the invention by way of example and not by way of limitation. This description will clearly enable one skilled in the art to make and use the invention and describes several embodiments, adaptions, variations, alternatives and uses of the invention, including what we presently believe is the best mode of carrying out the invention.

The motor designed for manufacturing 1 is illustrated in FIGS. 1–6 of the drawings while the method of assembly of the motor is illustrated in FIGS. 7–11 of the drawings. Additionally, FIGS. 12–14 further illustrate the self-compensating adjustment of a brush mounted in a novel brush holder/spring construction.

Reference is first made to FIGS. 1–6 of the drawings for a description of the motor designed for manufacturing 1, in order to further understand the method of assembly described in connection with FIGS. 7–11 of the drawings and the brush holder/spring element construction shown in FIGS. 11–15.

The motor designed for manufacturing 1 is an AC/DC or universal electrical motor which includes lower and upper supporting frames 3, 5, respectively, each of which rotatably support an armature assembly 7. A winding field assembly is supported between the upper and lower frames 3, 5 in surrounding relationship to the armature assembly 7. The lower end frame 3, winding field assembly 9 and upper end frame 5 are consecutively stacked upon and secured to one another as shown in FIGS. 1–6.

The lower supporting frame 3 is made of Poly Pro material and includes an internal metal bearing support 11 for supporting the bearing 13 that receives the armature or motor shaft 19 at one end of the armature assembly 7. The upper frame 5, is made from a strong and durable plastic material such as ABS plastic material. The upper frame 5 includes as part of the molded part A bearing support 15 for supporting the ball bearings 17 in order to rotatably mount the armature or motor shaft 19 of armature assembly 7 at an opposite end from the bearing 13. The bearing support is in the form of a plastic bearing cap 15 that is welded to the upper frame 5 to secure the ball bearings 17. The spaced bearings 13 and 17 thus rotatably support the armature shaft 19 in consistent and accurately aligned bearing supports, as illustrated. The armature or motor shaft 19 includes a fan 21 adjacent the bearing 13 for directing heat away from the motor 1. The armature 23 extends centrally about and is mounted to the rotating shaft 19 for cutting lines of force across the winding field assembly 9, as is well known. A commutator 25 is also mounted on the rotatable shaft 19 adjacent the bearing 17 for rotation relative to a pair of generally opposed carbon brushes that are mounted within opposing brush holders 29, 29 secured to the upper frame 5, in a manner to be described in further detail below. A blower wheel 31 is attached to the armature or motor shaft 19, through suitable fastening elements, in order to utilize the universal electrical motor 1 in utility vacuum cleaners and the like. Quite obviously, the armature or motor shaft 19 could also be attached to other elements for use in driving same, as will be apparent.

With the above general description of the motor 1, reference is now made to FIGS. 7–11 of the drawings for a description of the method of the present invention, as well as a further description of the motor 1 construction.

Figure 7:
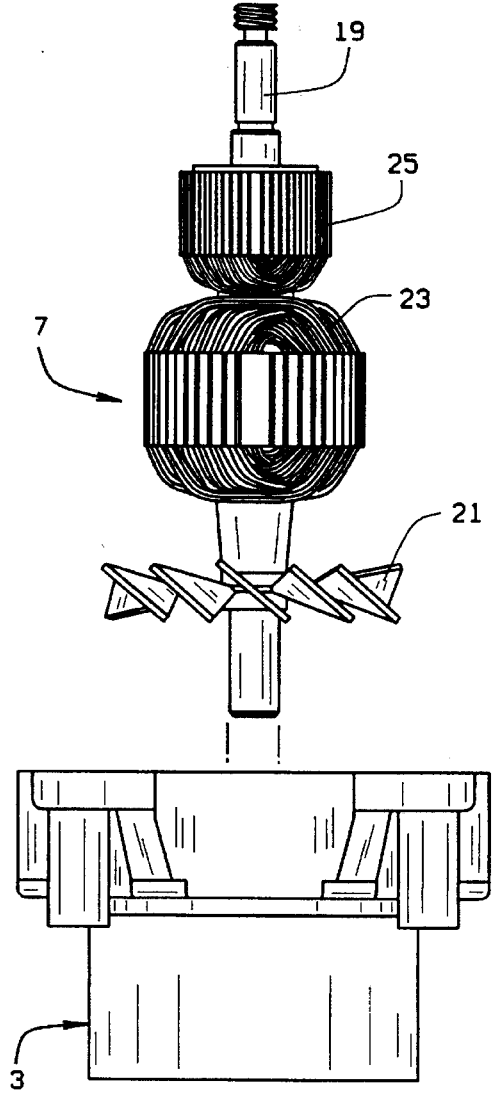
FIG. 7 is an exploded perspective view illustrating the first step in the method of assembling the motor designed for manufacturing in which one end of an armature assembly is inserted into a lower end frame of the motor.

As shown in FIG. 7 of the drawings, the first step in the method is the insertion of the armature assembly 7 into the bearing 13 (see FIG. 6) of the lower end frame 3. Typically, the lower end frame is first mounted in a complementary shaped fixture to facilitate the assembly of the various components of the motor 1.

Figure 8:
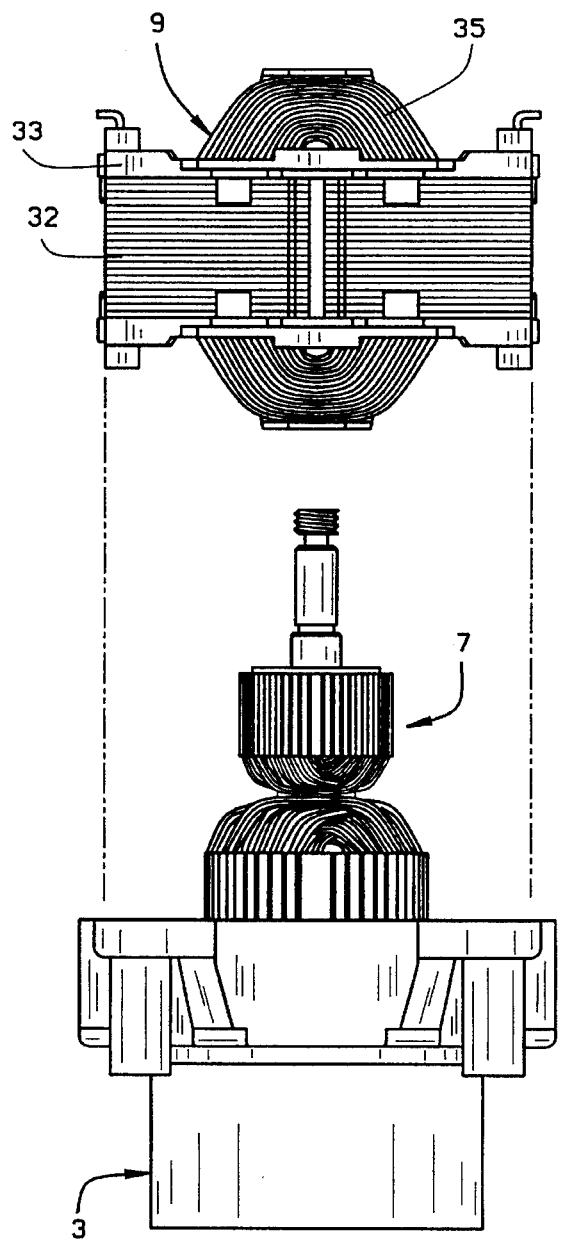
FIG. 8 illustrates the second step in the method of assembling the motor of the present invention in which a winding field assembly is positioned over the armature assembly prior to stacking the winding field assembly on the lower end frame.

The second step of the method is illustrated in FIG. 8 of the drawings in which the winding field assembly 9 is positioned over the armature assembly 7 while stacking the winding field assembly 9 on the lower end frame 3. The winding field assembly 9 is constructed of a series of rectangularly shaped stacked laminations 31 which are held together by the injection molded plastic holder or harness 33, also having a generally rectangular shape and constructed as illustrated to trap the rectangularly shaped stacked laminations 31, as best illustrated in FIG. 8. A pair of coil windings 35, 35 each surround a pole face (not shown) mounted internally of the holder or harness 33, in order to provide the winding field assembly 9.

It is important to note that the winding field assembly has a corresponding polygonal shape to both the lower and upper end frames 3, 5, in order to facilitate the orientation of such components relative to one another during assembly. Also, the winding field assembly is universally adaptable relative to the lower end frame 3, in order to facilitate the stacking of the winding field assembly 9 on the lower end frame 3 in one of the at least several relative positions to one another. Thus, it is unnecessary to orient the polygonally shaped winding field assembly 9 with the corresponding polygonally shaped lower end frame 3 in a particular orientation since they are complementary shaped relative to one another to facilitate the stacking of the winding field assembly 9 on the lower end frame 3 in one of at least several relative positions to each other.

Figure 9:
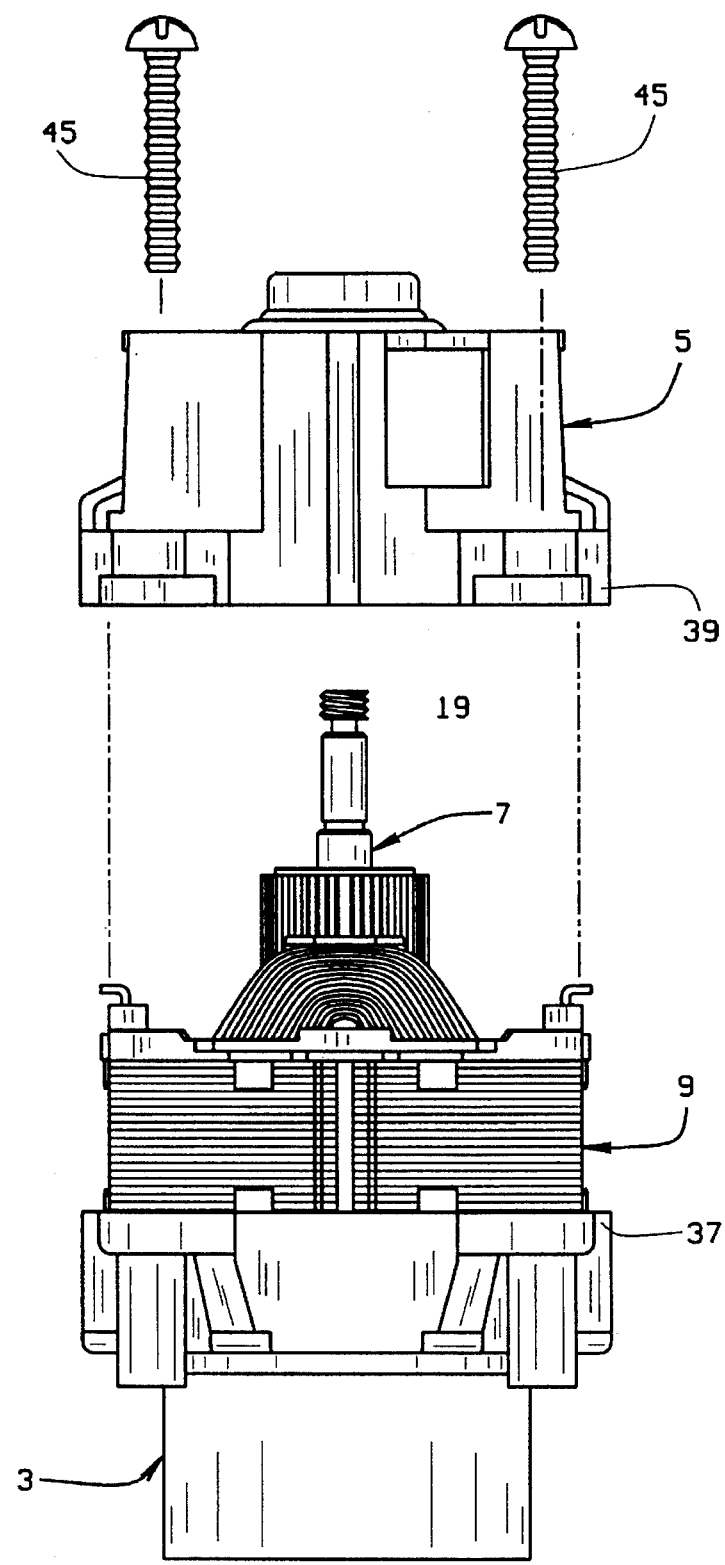
FIG. 9 illustrates another step in the method of assembly of the present invention in which the upper end frame is stacked on the winding field assembly prior to positioning an opposite end of the armature assembly into a bearing in the upper end frame.

When so stacked and assembled relative to one another, as shown in the lower half of FIG. 9, the lower end of the winding field assembly 9 is received within a peripherally extending flange 37 of the lower end frame 3, in order to prevent lateral or sideways movement of the winding field assembly 9 relative to the upper end frame 3 and the armature assembly 7.

The next step in the method is also illustrated in FIG. 9 in which the upper end frame 5 is stacked on the winding field assembly 9, while positioning an opposite end of the motor or armature shaft 19 of the armature assembly 7 into the bearing 17 (see FIG. 6) of the upper end frame 5. The lower end of the upper end frame 5 includes a peripherally extending flange 39 which is mounted over the upper end of the winding field assembly 9 in a manner similar to the reception by the lower end of the winding field assembly 9 within the peripherally extending flange 37 of the lower end frame 3. Thus, the corresponding polygonally shaped upper end frame 5 is stacked on the polygonally shaped and universally adaptable winding field assembly 9 which is, in turn, stacked on the polygonally shaped lower end frame 3, after the armature assembly 7 is inserted into the bearing of the polygonally shaped lower end frame 3.

It should be borne in mind that while the winding field assembly 9 is universally adaptable to the lower end frame 3, it will seat in only 2 positions 180° apart from one another relative to the upper frame 5. This is due to the terminals of the winding field assembly 9 which interfere with the upper frame 5 unless oriented in one of the two positions 180° apart from one another.

For securing the lower end frame 3, winding field assembly 9 and upper end frame 5 to each other, it will be noted that each of these elements are provided with peripherally spaced and complementary shaped fastening ears which are aligned during assembly. More specifically, as best seen in FIG. 4 of the drawings, the lower end frame includes a pair of peripherally spaced and complementary shaped apertured fastening ears 41, 41, while the upper end frame, as best seen in FIG. 5 of the drawings, includes four peripherally spaced and aligned apertured fastening ears 43, 43, 43, 43 which are positioned approximately 90° apart from one another. The laminations 32 of the winding field assembly 9 are also provided with four peripherally spaced apertured fastening ears (not shown) which are formed in the corners of the lamination 32 for alignment with the four peripherally spaced fastening ears 43, 43, 43, 43 of the upper end frame 7, as best seen in FIG. 1 of the drawings.

After the polygonally shaped and universally adaptable winding assembly 9 is stacked on the lower end frame 3, any two of the four peripherally spaced apertured fastening ears (not shown) of the winding field assembly 9 are aligned relative to the peripherally spaced apertured fastening ears 41, 41 of the lower end frame. Subsequently, when the upper end frame 5 is mounted on the winding field assembly 9, the four peripherally spaced apertured fastening ears 43, 43, 43, 43 of the upper end frame 5 are then capable of being aligned with the four apertured fastening ears formed in the laminations 31 of the winding field assembly 9. Thereafter, a pair of threaded elements 45, 45 can be inserted and threaded into two of the four peripherally spaced and apertured fastening ears of the upper end frame 5 and winding field assembly 9 for threaded assembly to the spaced apertured fastening ears 41, 41 of the lower end frame 3. In this way, the components forming the motor 1 can be secured and stacked and assembled relationship to one another.

Figure 10:
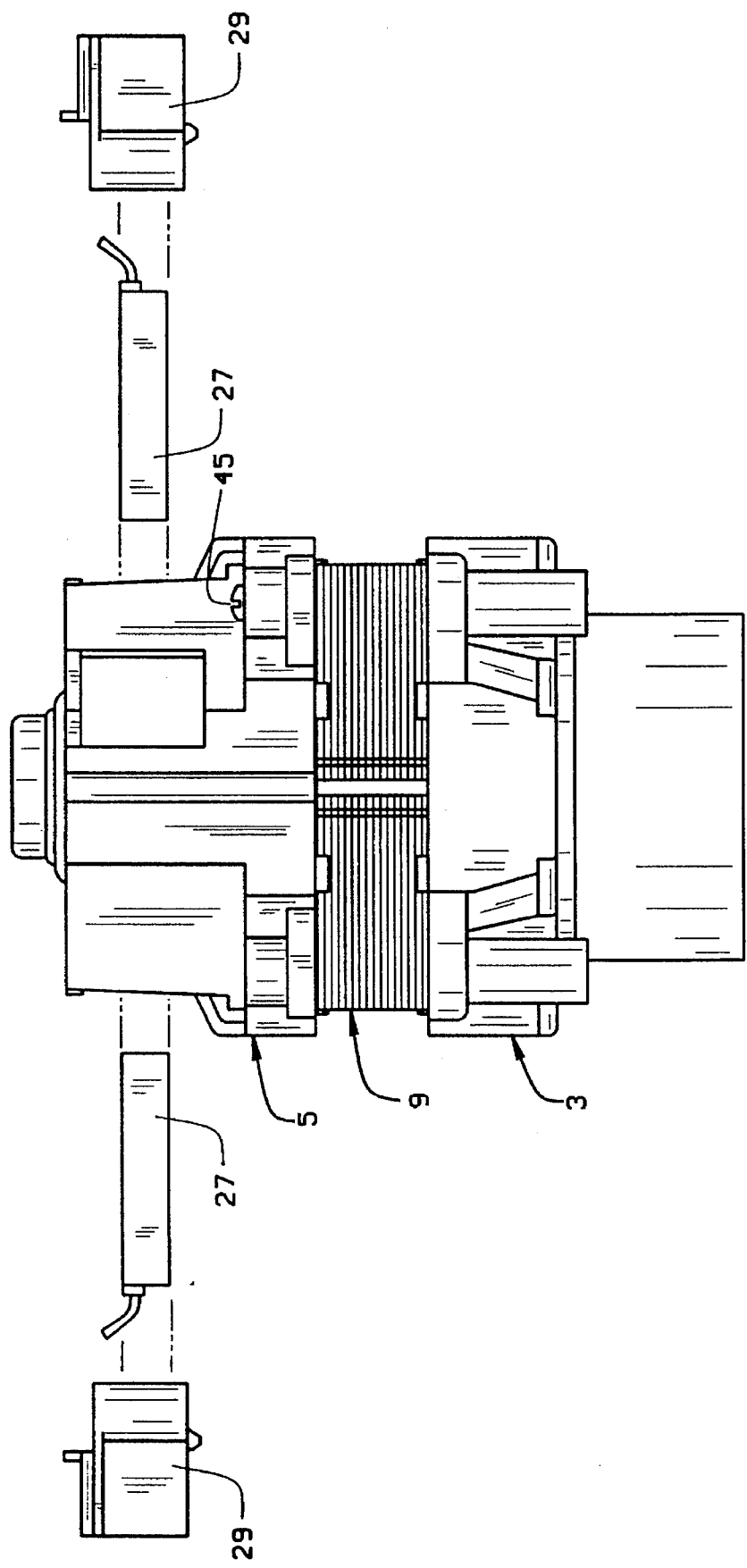
FIG. 10 is an exploded side perspective view illustrating a further step in the method of assembly of the present invention in which brush elements are assembled into the upper end frame.

The final step of the method of the present invention is illustrated in FIG. 10 of the drawings, in which brush elements 27, 27 are assembled to the upper frame 5 with an inner end of the brush elements 27, 27 being located in proximity to the commutator 25 on the armature assembly 7, as best seen in FIG. 6 of the drawings. For this purpose, the brush elements are mounted into brush holders 29, 29 which include locking elements for releasably interlocking the brush holders 29, 29 to the upper end frame 5.

Figure 11:
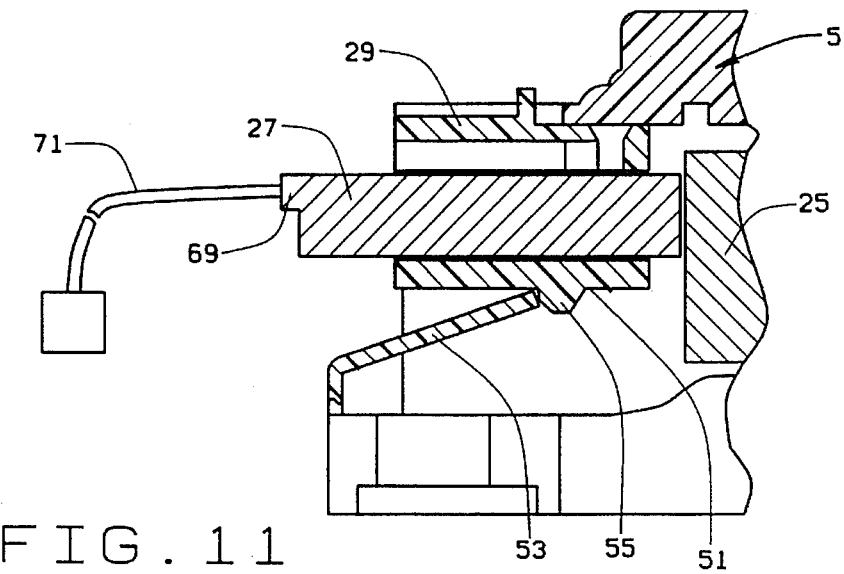
FIG. 11 is an enlarged fragmentary sectional view illustrating the manner in which the brush elements are releasably assembled relative to the upper end frame of the motor.

This is best illustrated in FIG. 11 of the drawings in which a brush holder 29 is shown as including a lower shoulder or abutment 51 for releasable locking engagement with a deflectable finger 53 in the upper end frame 5. The construction of the shoulder or abutment 51 is such that it will deflect the finger 53 during assembly of the brush holder 29 to the upper end frame 5, until the shoulder or abutment: 51 extends past the angularly offset end portion 55, at which point the locking shoulder or abutment 51 will engage the angularly offset end portion 55 in releasable locking engagement, as will be appreciated. When assembled in this manner, the inner end of the brush element 27 is positioned in proximity to the commutator 25, as best shown in FIG. 11.

Figure 12:
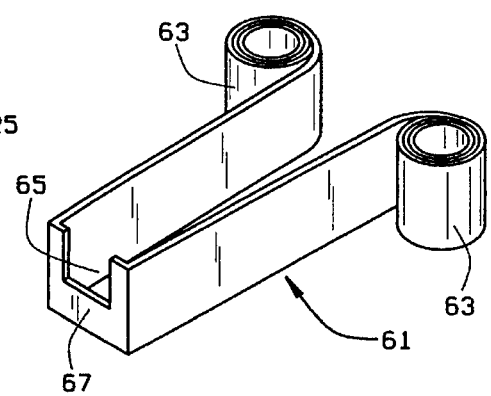
FIG. 12 is a fragmentary top elevational view, partly in section, of the brush holder mounting relative to the upper frame.

As best seen in FIG. 12, each brush holder 29 is also restrained against lateral or sideways movement relative to the upper frame 5 by complementary dovetail male surfaces 47 provided on each brush holder 29 and dovetail female surfaces 49 provided on the upper frame 5.

Figure 13:
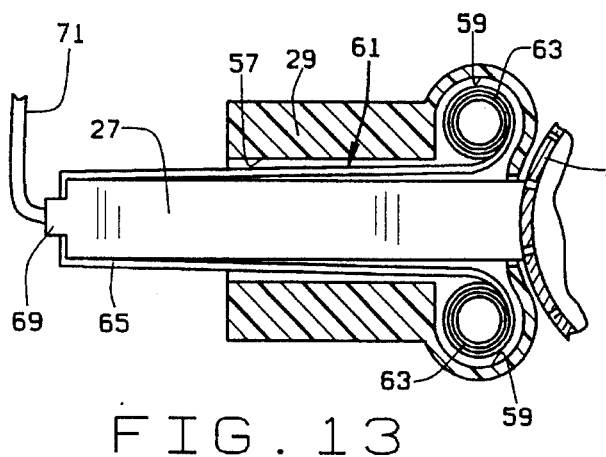
FIG. 13 is a fragmentary sectional view of the spring element with torsionally wounds used in conjunction with each brush element.
Figure 14:
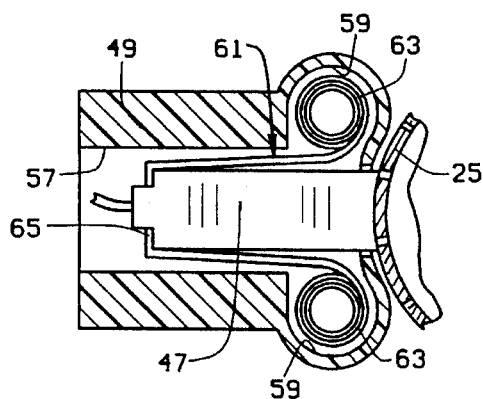
FIG. 14 Is a fragmentary sectional view of the spring element and associated brush element and illustrating the manner in which the spring element provides self-compensating adjustment for various positions of a brush relative to a commutator mounted on the armature assembly.
Figure 15:
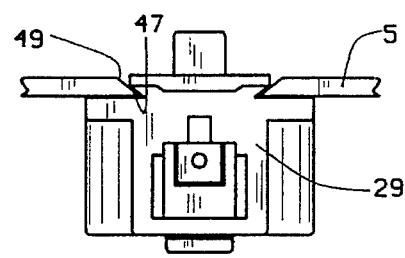
FIG. 15 is a perspective view of the spring element used with each brush holder.

Each of the brush holders 29 also include self-compensating adjustment means for each brush 27. As best seen in FIG. 12–14 of the drawings, the construction of the self-compensating adjustment means for each brush holder 29 is shown. Specifically, each brush holder includes an elongated slot 57 which extends generally longitudinally of the brush holder 29 for receiving the brush 27. Each brush holder 29 further includes a pair of generally cylindrically shaped openings 59, 59 on opposite sides of each elongated slot 57 which also intersect and open up into a respective associated elongated slot 57.

In order to hold and mount each brush 27 in its respective associated elongated slot 57, individual spring elements 61 are provided. The individual spring elements 61 are formed as a one-piece spring steel part with spaced, torsionally wound spring ends 63, 63 connected by an intermediate web section 65. A notch 67 is provided in the intermediate web section for mounting over a step 69 at the rear end of each brush 27. An external shunt 71 is joined to the rear of the brush 27, as best seen in FIGS. 11 and 13.

The spaced torsionally wound constant force spring ends 63, 63 are complementary shaped relative to the generally cylindrically shaped openings 59, 59 of each brush holder 29 for reception therein with the intermediate web section 65 extending across a respective associated elongated slot 57 for engaging the rear end of an associated brush 27 along an outer or rear surface thereof. The torsionally wound spring ends 63, 63 of each individual spring element 61 are jointly progressively unwound to enlarged the intermediate web section 65 upon the insertion of a brush 27 within the brush holder 29. As each brush 27 is worn down by frictional engagement with the commutator 25, the intermediate web section 65 will, in conjunction with the torsionally wound spring end 63, 63, provide a self-compensating adjustment means for various positions of an associated brush 27.

It will be appreciated that the aforementioned brush holder/spring element construction requires very few elements to hold and mount each brush 27 within an associated brush holder 29, while providing the desired self-compensating adjustment relative to the commutator 25.

From the foregoing, it will now be appreciated that the motor designed for manufacturing and its method of manufacture according to the present invention utilize a stacked component arrangement to facilitate assembly of the various components relative to one another, including when located in various relative positions to one another. The method of fastening the stacked components relative to one another and the snap-in assembly of brush elements relative to a commutator mounted on an armature assembly is also greatly facilitated. The resulting motor produces consistently and accurately aligned bearing and motor shaft components which enhance motor efficiency, performance and longevity. In addition, the self-compensating adjustment means for commutator brush elements are provided with a novel and unique arrangement which requires a minimum number of parts to achieve the desired self-compensating adjustment.

In view of the above, it will be seen that the several objects and features of this invention have been achieved and other advantageous results have been obtained.

As various changes would be made in the above described motor designed for manufacturing and its method of assembly without departing from the scope of the invention, it is intended that all matter contained in the above description or shown in the accompanying drawings shall be interpreted as illustrative and not in a limiting sense.

We claim:

1. The method of assembling an electric motor having lower and upper end frames each having peripherally extending stacking/alignment flanges at one end and bearings at an opposite end, an armature assembly rotatably mounted in the bearings of the lower and upper end frames, and a winding field assembly supported between the lower and upper end frames and surrounding the armature assembly, comprising the steps of:

inserting one end of the armature assembly into the bearing of the lower end frame;

positioning the winding field assembly over the armature assembly while also stacking and aligning the winding field assembly on the peripherally extending stacking aligning flange of the lower end frame;

stacking and aligning the upper end frame on the winding field assembly through the positionment of the peripherally extending stacking/alignment flange of the upper end frame on the winding field assembly while also positioning an opposite end of the armature assembly into the bearing of the upper end frame; and securing the lower end frame, winding field assembly and upper end frame to each other.

2. The method as defined in claim 1 wherein the winding field assembly is universally adaptable relative to the lower end frame and the method includes the further step of stacking the winding field assembly on the lower end frame in one of at least several relative positions to each other.

3. The method as defined in claim 2 wherein the lower and upper end frames and winding field assembly have corresponding polygonal shapes and the method includes the further step of orienting the polygonally shaped lower end frame, winding assembly and upper end frame during assembly to one another.

4. The method as defined in claim 3 wherein the lower end frame, winding field assembly and upper end frame are also provided with peripherally spaced and complementary shaped fastening ears and the method includes the further step of also aligning the peripherally spaced fastening ears during the assembly of the lower end frame, winding field assembly and upper end frame relative to one another.

5. The method as defined in claim 4 wherein the lower end frame, winding field assembly and upper end frame each include a plurality of peripherally spaced and aligned complementary shaped apertured fastening ears, and the method includes the further step of inserting and securing two threaded elements in two of the four peripherally spaced and aligned fastening ears which are positioned 180° apart from one another.

6. The method of assembling an electric motor having corresponding polygonally shaped lower and upper end frames with peripherally extending stacking/alignment flanges at one end and bearings at an opposite end, an armature assembly rotatably mounted in the bearings of the lower and upper end frames, and a polygonally shaped and universally adaptable winding field assembly supported between the polygonally shaped lower and upper end frames and surrounding the armature assembly, comprising the steps of:

- positioning the polygonally shaped lower end frame in a fixture;
- inserting one end of the armature assembly into the bearing of the polygonally shaped lower end frame;
- positioning the polygonally shaped and universally adaptable winding field assembly over the armature assembly while also stacking and aligning the polygonally shaped and universally adaptable winding field assembly in any one of a number of relative positions on the peripherally extending stacking/alignment flange of the polygonally shaped lower end frame;
- stacking and aligning the polygonally shaped upper end frame on the polygonally shaped and universally adaptable winding field assembly through the positionment of the peripherally extending stacking/alignment flange of the upper end frame on the winding field assembly while also positioning an opposite end of the armature assembly into the bearing of the upper end flame; and
- securing the polygonally shaped lower end frame, winding field assembly and upper end frame to each other.

* * * * *